US010325087B1

(12) United States Patent
Goodsitt et al.

(10) Patent No.: US 10,325,087 B1
(45) Date of Patent: Jun. 18, 2019

(54) SYSTEMS AND METHODS FOR AUTHENTICATING A USER AT A PUBLIC TERMINAL

(71) Applicant: Capital One Services, LLC, McLean, VA (US)

(72) Inventors: Jeremy Goodsitt, Champaign, IL (US); Fardin Abdi Taghi Abad, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/030,814

(22) Filed: Jul. 9, 2018

(51) Int. Cl.
| H04L 29/06 | (2006.01) |
| G06F 21/36 | (2013.01) |
| H04L 9/32 | (2006.01) |
| G06K 7/12 | (2006.01) |
| G06K 19/06 | (2006.01) |
| G06K 7/14 | (2006.01) |

(52) U.S. Cl.
CPC .............. *G06F 21/36* (2013.01); *G06K 7/12* (2013.01); *G06K 7/1417* (2013.01); *G06K 19/06037* (2013.01); *H04L 9/3242* (2013.01)

(58) Field of Classification Search
CPC ............... G06F 21/36; G06K 7/1417; G06K 19/06037; G06K 7/12; H04L 9/3242
USPC ............................................. 726/4–8, 17–19
See application file for complete search history.

(56) References Cited

U.S. PATENT DOCUMENTS

| 8,418,920 | B2 * | 4/2013 | Lieberman | G06Q 40/123 235/383 |
| 8,768,838 | B1 * | 7/2014 | Hoffman | G06Q 40/00 705/44 |
| 8,857,713 | B2 * | 10/2014 | Lieberman | G06Q 40/123 235/383 |
| 8,924,712 | B2 | 12/2014 | Varadarajan et al. | |
| 9,811,706 | B2 * | 11/2017 | Papazian | G06K 7/1417 |
| 9,846,863 | B2 * | 12/2017 | Grossi | G06Q 20/12 |
| 2013/0124855 | A1 * | 5/2013 | Varadarajan | G06Q 20/3276 713/155 |
| 2015/0278805 | A1 * | 10/2015 | Spencer, III | G06F 21/36 705/44 |
| 2016/0042602 | A1 * | 2/2016 | Phan | G07F 17/3237 463/29 |
| 2017/0091730 | A1 | 3/2017 | Gurunathan et al. | |

(Continued)

*Primary Examiner* — Jahangir Kabir
(74) *Attorney, Agent, or Firm* — Finnegan, Henderson, Farabow, Garrett & Dunner, LLP

(57) ABSTRACT

Systems and methods for authenticating a user to access a public terminal are described. Disclosed embodiments may include reading, using the physical credential reader, a user identifier from the physical credential device. Disclosed embodiments may also include transmitting the public terminal identifier and the user identifier to a secure server. Further, disclosed embodiments may include receiving, after completing the transmission, a unique code from the secure server. Disclose embodiments may additionally include displaying the unique code on the display device. Disclosed embodiments may include receiving, after displaying the unique code, an authentication message from the secure server. Disclosed embodiments may further include, responsive to receiving the authentication message, authorizing the user to use a terminal command at the public terminal.

11 Claims, 8 Drawing Sheets

(56) References Cited

U.S. PATENT DOCUMENTS

| | | | |
|---|---|---|---|
| 2018/0025339 A1* | 1/2018 | Craft | G06Q 20/045 |
| | | | 705/14.38 |
| 2018/0247287 A1* | 8/2018 | Narasimhan | G06Q 20/12 |
| 2018/0357636 A1* | 12/2018 | Kumar | G06Q 20/367 |
| 2019/0034901 A1* | 1/2019 | Gaur | G06Q 20/206 |

* cited by examiner

SYSTEMS AND METHODS FOR AUTHENTICATING A USER AT A PUBLIC TERMINAL

TECHNICAL FIELD

The disclosed embodiments generally relate to information technology security, and more particularly, to securely authenticating a user at a public terminal.

BACKGROUND

Some computer systems include arrangements in which certain terminals are public and may operated by many different users. For example, a computing system may include a terminal that is available for anyone in the public to use. In order to customize a public terminal for an individual's use and/or to block unwanted users from accessing the system through the public terminal, a system may require a user to present a credential, such as a personal identifier and/or passcode. The credentials may allow the user to access user-specific applications, databases, and information.

In the example context of a financial computer network, automatic teller machines (ATMs) and point-of-sale (POS) systems may act as public terminals. For example, ATMs may be located on city streets, accessible to anyone in the area. And, a user of that public terminal may present a payment card, sometimes in conjunction with entry of a personal identification number (PIN), to access the public terminal, for example, to complete a purchase or withdraw currency. However, proper authorization depends on the user being authenticated so that the system can trust that the user is who he or she purports to be. Otherwise, the system has no way to determine that a user only view and manages funds of his or her own accounts.

SUMMARY

The disclosed embodiments address disadvantages of existing systems by providing novel systems, methods, and techniques for securely authorizing a user to access a public terminal. Unlike any prior implementations, the disclosed systems and methods improve authorization of a user to use a public terminal by using multiple (e.g., three) factors to authenticate a user, for example. Thus, the disclosed systems and methods may provide an improved authorization scheme that solves issues identified with existing authentication mechanisms, such as single factor (e.g., PIN-based) authentication, which may be susceptible to being compromised. Further, by using more secure authorization methods, the risks of an un-trusted third party discovering a security key through eavesdropping may be reduced, speed of pairing between the two devices may be increased, and the amount of overhead that is required to share security keys may be reduced over pre-existing systems.

Consistent with certain disclosed embodiments, a method is provided for authenticating a user to access a public terminal using three forms of authentication. The method may include the step of receiving a user identifier of a physical credential device. Also, the method may include generating, based on the public terminal identifier and the user identifier, a unique code. The method may also include receiving a photograph from an unlocked mobile phone. Further, the method may include the step of, responsive to determining that the received photograph corresponds to the unique code, providing a user profile to the unlocked mobile phone, the user profile including an identification of a type of password interface. Additionally, the method may include the step of, responsive to receiving, from the unlocked mobile phone, password input data originating from the identified type of password interface that matches a password of the user profile, transmitting an instruction to at least one of the unlocked mobile phone and the public terminal to allow the user to enter one or more commands affecting the public terminal.

Moreover, consistent with certain disclosed embodiments, a system is provided for authenticating a user to access a public terminal using three forms of authentication. The system may include a display device, a physical credential reader, a memory storing instructions, and one or more processors. The one or more processors may be configured to perform operations including reading a user identifier from the physical credential device using the physical credential reader. The operations may further include transmitting the public terminal identifier and the user identifier to a secure server. Additionally, the operations may include receiving, after completing the transmission of the public terminal identifier and the user identifier, a unique code from the secure server. The operations may include displaying the unique code on the display device. The operations may include receiving, after displaying the unique code, an authentication message from the secure server. Also, the operations may include, responsive to receiving the authentication message, authenticating the user to use a terminal command at the public terminal.

Consistent with certain disclosed embodiments, a method is provided for using a computing device to authenticate a user to access a public terminal. The method may include a step of receiving, from the public terminal, a unique code. The method may also include a step of transmitting a request for a user profile to a server, the request being based on the unique code. The method may further include a step of receiving the user profile in response to the request. Also, the method may include a step of providing, based on the user profile, a password interface in a secure application running on the computing device. The method may include the step of receiving user input at the password interface. Additionally, the method may include the step of transmitting the user input to the secure server. The method may also include the step of, responsive to receiving authentication, commencing a session at the public terminal.

In addition, consistent with certain disclosed embodiments, a system is provided for using a computing device to authenticate a user to access a public terminal. The system may include a memory storing instructions and one or more processors. The one or more processors may be configured to perform operations including receiving a unique code from a public terminal. The operations may further include transmitting a request for a user profile to a server, the request being based on the unique code. Also, the operations may include receiving the user profile in response to the request. The operations may additionally include providing, based on the user profile, a password interface in a secure application running on the computing device. The operations may include receiving user input at the password interface. Further, the operations may include transmitting the user input to the secure server. The operations may further also responsive to receiving authentication, commencing a session at the public terminal.

Aspects of the disclosed embodiments may also include a non-transitory tangible computer-readable medium that stores software instructions that, when executed by one or more processors, configure the one or more processors to perform one or more of the methods, operations, and the like consistent with the disclosed embodiments.

It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
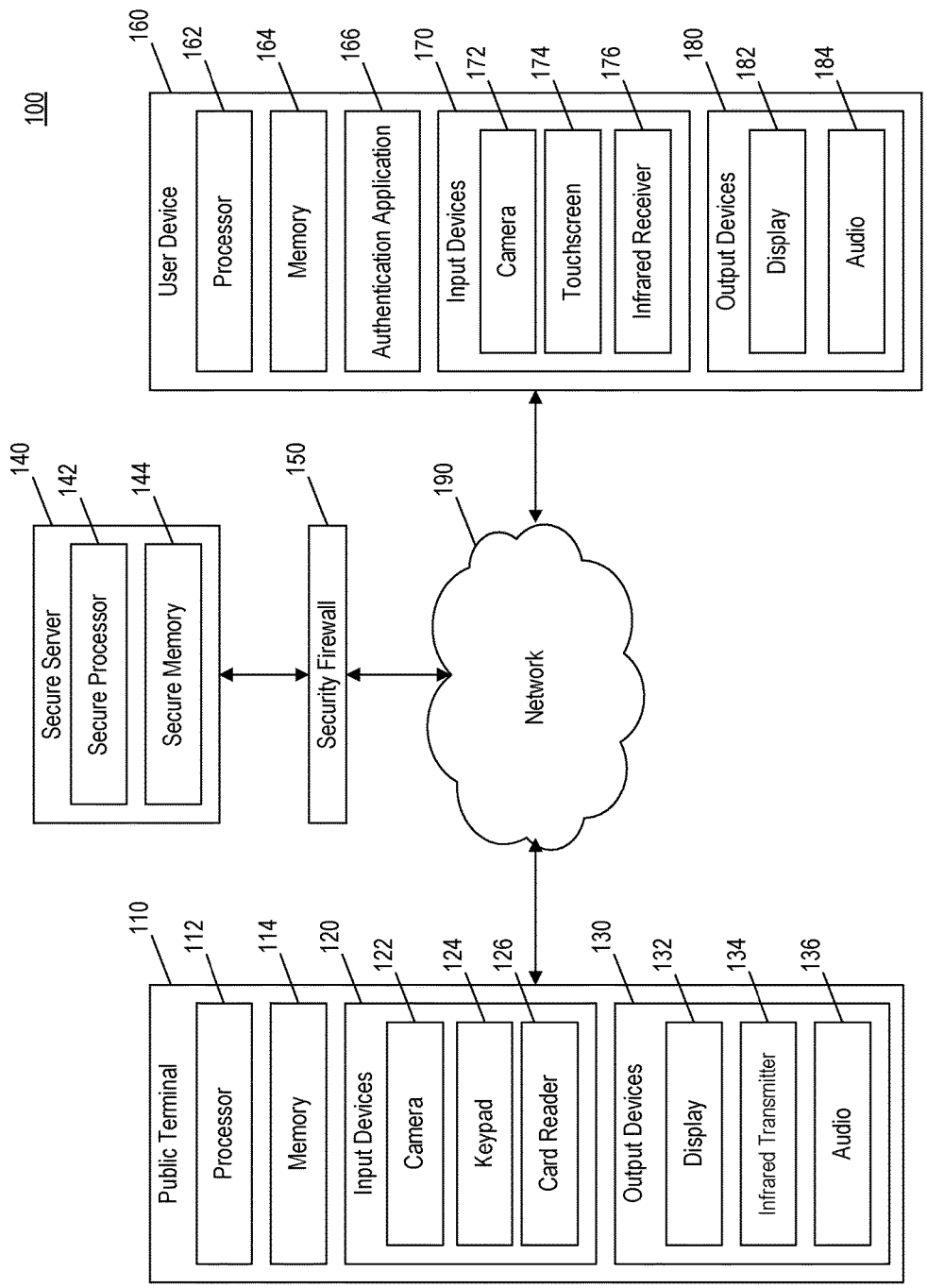
FIG. 1 is a block diagram of an example system environment for securely authenticating a user at a public terminal.

The disclosed embodiments are directed to systems and methods for authenticating a user at a public terminal, for example, to determine whether the user is authorized to operate the public terminal. Authentication is necessary to verify the identity of a user, which may in turn determine what permissions or authorizations the user may have at a given public terminal. In particular, the disclosed systems and methods include techniques for authenticating a user at a public terminal using multiple forms of authentication in combination. As an example, the disclosed embodiments may involve a scenario where a user possesses a mobile device and a physical authentication credential when approaching a terminal. Using this scenario, the user may provide the physical authentication credential to the public terminal (e.g., scanning a magnetic strip card or inserting a chip card), after which the public terminal may prompt the user to enter a personal identification code (e.g., a PIN) associated with the physical identification credential. The public terminal may then provide the user with a mobile device code or pattern (also referred to as a "unique code") to scan or receive using, for example, a mobile device that is unlocked. Next, the unlocked mobile device may transmit the scanned input from the public terminal to a secure server. In some embodiments, the mobile device transmits the scanned input to a secure server with a key indicating that the mobile device is a trusted device. The key may be used as a hash key input to cryptographically encode the scanned input. The key may have been previously transmitted from a secure server to the mobile device. The server may verify that the scan matches the pattern provided by the public terminal, and transmit a user profile to the mobile device. Based on the user profile, the mobile device may present a password interface within an application running on the mobile device. Input received at the password interface may then be sent to the secure server for verification. Once the password interface input is verified, the secure server may transmit an authentication message to the public terminal and/or mobile device to authorize the user to user the public terminal.

Disclosed embodiments may relate to using "triple factor" authentication. For example, embodiments may use three forms of authentication to authorize a user to use a public terminal. The forms of authentication may include, for example, (1) a user's personal identification number (PIN) associated with a user's identification card; (2) a mobile device authentication mechanism (e.g., numeric sequence, alphanumeric password, fingerprint scan, and/or facial recognition); and (3) a user-selected authentication mechanism within a secure application running on the mobile device.

As to the first example of a user PIN, a user may submit an identification card (e.g., access badge, keycard, magnetic strip card, proximity card, Department of Defense Common Access Card (CAC Card), Homeland Security Presidential Directive 12 (HSPD-12) compliant card, credit card, debit card) that in disclosed embodiments is then read by a device. In other embodiments a numeric PIN or alphanumeric password is received from a user associated with the identification card. Yet other embodiments may employ an identification form other than a card, such as a radiofrequency identification (RFID) fob, a universal serial bus (USB) fob, a physical key, or other form of physical identification credential, for example.

As to the second example of a mobile device authentication mechanism, disclosed embodiments a mobile device unlocking mechanism may be used in disclosed embodiments as an authentication mechanism. For example, smartphones that use a user password or biometric information may be employed in disclosed embodiments to authenticate the user to operate the mobile device. User passwords may include, for example, numeric PINs (e.g., four-, six-, or eight-digit PINs) and/or alphanumeric passwords. Biometric authentication may include, for example, fingerprint scans, facial recognition, voice recognition, retinal scans, iris recognition, and/or vascular pattern recognition. The user's mobile device may include an input mechanism and/or sensor(s) to receive input of the biometric information and/or user password. Additional mobile devices authentication mechanisms may be used with disclosed embodiments, even if not explicitly named here.

In some embodiments, mobile device authentication mechanism will only work when the mobile device is identified as a trusted mobile device. Upon satisfying authentication measures, secure server may transmit a key to mobile device, which mobile device may use to indicate that it is a trusted device when transmitting information to a secure server. For example, mobile device may perform a hash function on data to be transmitted to secure server using the key. Secure server may use an inverse key to decrypt the data, ensuring that the data came from a trusted device. In other examples, mobile device may transmit the key along with data to secure server.

As to the third example of a user-selected authentication mechanism within a secure application, an application-based password derived from user profile information associated with the application may be used. The password interface may be any interface provided the application. For example, the password interface may involve a password (e.g., numeric, alphanumeric) to be entered in a password field of a graphical user interface. In other examples, the password interface may involve a pattern to be received from the user at a touchscreen user interface. For example, the user may draw an object, an abstract pattern, or a signature on a touchscreen. In still other examples, a password user interface may be presented, in which the user, by selecting or dragging, moves images on a touchscreen user interface of a mobile device.

Other forms of authentication may be used in addition to or instead of the three exemplary authentication forms listed above. Further, while certain embodiments use three forms of authentication, embodiments of this disclosure may use fewer or more forms of authentication. For example, authentication, as used in some embodiments, may include one, two, four, five, ten, or any number of forms of authentication.

Reference will now be made in detail to the disclosed embodiments, examples of which are illustrated in the accompanying drawings. Wherever convenient, the same reference numbers will be used throughout the drawings to refer to the same or like parts.

FIG. 1 shows a block diagram of an example system environment for securely authenticating a user at a public terminal. The components and arrangements shown in FIG. 1 are not intended to limit the disclosed embodiments, as the components used to implement the disclosed processes and features may vary.

Consistent with disclosed embodiments, a system 100 may include a public terminal 110, a secure server 140, a user device 160, and/or a network 190. Other components known to one of ordinary skill in the art may be included in system 100 to gather, process, transmit, receive, and provide information used in conjunction with the disclosed embodiments.

Public terminal 110 may be a device comprising a memory, processor, and other specialized hardware that is configured to transmit a pattern using a particular communication method or medium to user device 160. For example, public terminal 110 may include a transmitter capable of transmitting a pattern using a medium of light (e.g., an LCD display, an e-ink display, a light-emitting diode, an incandescent light bulb, an infrared transmitter, etc.), sound (e.g., a speaker, a digital audio transmitter, a frequency modulation transmitter), thermal energy (e.g., thermoelectric power generator, fan, infrared laser, etc.), vibrations (e.g., a motor, such as a Pico Haptic™ shaftless vibration motor, etc.), pulses of air (e.g., a fan, an air compressor, etc.) or the like to user device 160.

In disclosed embodiments, public terminal 110 may include one or more processors 112, a memory 114, input devices 120, and/or output devices 130. Processor 112 may be one or more known processing devices, such as a microprocessor from the Pentium™ or Atom™ families manufactured by Intel™, the Turion™ family manufactured by AMD™, the Exynos™ family manufactured by Samsung™, or the Snapdragon™ family manufactured by Qualcomm™. Processor 112 may constitute a single-core or multiple-core processor that executes parallel processes simultaneously. For example, processor 112 may be a single-core processor configured with virtual processing technologies. In certain embodiments, processor 112 may use logical processors to simultaneously execute and control multiple processes. Processor 112 may implement virtual machine technologies, or other known technologies to provide the ability to execute, control, run, manipulate, store, etc. multiple software processes, applications, programs, etc. In another embodiment, processor 112 may include a multiple-core processor arrangement (e.g., dual-core, quad-core, etc.) configured to provide parallel processing functionalities to allow public terminal 110 to execute multiple processes simultaneously. One of ordinary skill in the art would understand that other types of processor arrangements could be implemented that provide for the capabilities disclosed herein.

Memory 114 may be a volatile or non-volatile, magnetic, semiconductor, tape, optical, removable, non-removable, or other type of storage device or tangible (i.e., non-transitory) computer-readable medium that stores one or more program(s), such as an application and data storage. Data storage may store, for example, a user's personal information, account information, displays, settings, one or more pairing configurations, one or more logs, and preferences.

Input devices 120 may include devices to receive user and/or computer input, such as a camera 122, a keypad 124, and/or a card reader 126. Camera 122 may be a device capable of capturing visual spectrum. For example, camera 122 may include a CCD (charge-coupled device) camera, a CMOS (complementary metal-oxide-semiconductor) camera, and the like. Keypad 124 may include a mechanism to provide user input, such as by selecting letters and/or numbers. For example, keypad 124 may include a keyboard, a number pad, tactile buttons, capacitive buttons, mechanical switches, one or more touchscreens, and the like. Card reader 126 man be a device capable of reading a physical credential from a user. For example, card reader 126 may include a magnetic strip reader, an RFID reader, a secure chip reader, a near-field communication (NFC) device, and the like.

Output devices 130 may include devices or components to provide data. in some embodiments, output devices 130 may include display 132, infrared transmitter 134, and/or audio output 136. Display 132 may include a device capable of receiving computer data and presenting it visually. As an example, display 132 may include a liquid crystal display (LCD), an e-ink display, a light-emitting diode (LED) display, a cathode ray tube (CRT) display, and the like. Infrared transmitter 134 may be a device capable of transmitting signals in the infrared spectrum. For example, infrared transmitter may include one or more infrared LEDs with associated driver circuitry. Audio output 136 may include a device capable of producing sound. For example, audio output 136 may include one or more of a piezoelectric speaker, an electric loudspeaker, an electrostatic speaker, a soundbar, a subwoofer, and the like.

While not shown in FIG. 1, output devices 130, in certain embodiments, may include one or more devices capable of transmitting patterns in specific media. That is, output devices 130 may comprise one or more elements capable of transmitting a pattern using one or more of light, sound, thermal energy, vibrations, air pulses, or the like to user device 160. For example, transmitters may include one or more light-emitting elements capable of transmitting blinking indicators, multi-colored indicators, etc. to user device 160. Transmitters may also include thermoelectric devices, fans capable of producing pulse of air, motors capable of producing vibrations, speakers, etc. In the disclosed embodiments, transmitters may include specialized hardware elements of a form factor configured to be provided as part of a card or card type of public terminal 110.

Public terminal 110 may be a terminal that is accessible to the general population. In one example, public terminal 110 may be a general-purpose computer that is available to the public, such as a computer available at a public library or information center. In other examples, public terminal 110 may be a specialized computer. For example, public terminal 110 may be a ticket kiosk, a self-checkout system, an ATM, a POS system, and the like.

User device 160 may be a device comprising a memory, a processor, and other specialized hardware that is configured to receive a pattern from public terminal 110 that is transmitted using a particular communication method or medium. For example, user device 160 may include a sensor capable receiving or detecting a pattern transmitted by a medium of light (e.g., a camera, a light sensor, etc.), sound (e.g., a microphone, etc.), thermal energy (e.g., a heat detector, etc.), vibrations (e.g., a piezoelectric accelerometer, a velocity sensor, a proximity probe, etc.), pulses of air (e.g., a piezoelectric accelerometer, a velocity sensor, a proximity probe, etc.), or the like from public terminal 110.

User device 160 may also be associated with a user. In some embodiments, the user may be an individual associated with one or more accounts, and user device 160 may be associated with or include information concerning one or more of these accounts.

User device 160 may include one or more of a processor 162, a memory 164, an authentication application 166, input devices 170, and/or output devices 180. Processor 162 may be one or more known processing devices, such as a microprocessor from the Pentium™ or Atom™ families manufactured by Intel™, the Turion™ family manufactured by AMD™, the Exynos™ family manufactured by Samsung™, or the Snapdragon™ family manufactured by Qualcomm™. Processor 162 may constitute a single-core or multiple-core processor that executes parallel processes simultaneously. For example, processor 162 may be a single-core processor configured with virtual processing technologies. In certain embodiments, processor 162 may use logical processors to simultaneously execute and control multiple processes. Processor 162 may implement virtual machine technologies, or other known technologies to provide the ability to execute, control, run, manipulate, store, etc. multiple software processes, applications, programs, etc. In another embodiment, processor 162 may include a multiple-core processor arrangement (e.g., dual-core, quad-core, etc.) configured to provide parallel processing functionalities to allow user device 160 to execute multiple processes simultaneously. One of ordinary skill in the art would understand that other types of processor arrangements could be implemented that provide for the capabilities disclosed herein.

Memory 164 may be a volatile or non-volatile, magnetic, semiconductor, tape, optical, removable, non-removable, or other type of storage device or tangible (i.e., non-transitory) computer-readable medium that stores one or more program(s), such as an application and data storage. Data storage may store, for example, a user's personal information, account information, displays, settings, one or more pairing configurations, one or more logs, and preferences.

Authentication application 166 may be a software application that executes on user device 160 using processor 162 and memory 164. Authentication application may be a computer program that is used to authenticate a user. For example, authentication application may present a password user interface to a user to receive password input from a user. The interface may include, for example, numeric or alphanumeric entry fields, pattern entry fields, image selection fields, and the like. In an embodiment, authentication application may be an application provided by a financial institution to allow the user to interact with one or more accounts of the financial institution. The financial application may include a password prompt to authenticate the user prior to providing the user with access to the user's account.

Input devices 170 may include devices to receive user and/or computer input. In some embodiments, input devices 170 may include a camera 172, a touchscreen 174, and/or an infrared receiver 176. Camera 172 may be a device capable of capturing visual spectrum. For example, camera 172 may include a CCD camera, a CMOS camera, and the like. Touchscreen 174 may include a mechanism to receive user input, such as by interacting with a graphical user interface. For example, touchscreen 174 may include a capacitive touchscreen. In other examples, in addition to touchscreen 174, input devices 170 may include other input mechanisms such as a keyboard, a number pad, tactile buttons, capacitive buttons, mechanical switches, and the like. Infrared receiver 176 may be a device or circuitry capable of receiving and/or sensing infrared signals.

Output devices 180 may include devices or components to provide data. In some embodiments, output devices 180 may include a display 182 and/or an audio output 184. Display 182 may include a device capable of receiving computer data and presenting it visually. As an example, display 182 may include a liquid crystal display (LCD), an e-ink display, a light-emitting diode (LED) display, a cathode ray tube (CRT) display, and the like. Infrared transmitter 134 may be a device capable of transmitting signals in the infrared spectrum. For example, infrared transmitter may include one or more infrared LEDs with associated driver circuitry. Audio output 136 may include a device capable of producing sound. For example, audio output 136 may include one or more of a piezoelectric speaker, an electric loudspeaker, an electrostatic speaker, a soundbar, a subwoofer, and the like.

Network 190 may comprise any type of computer networking arrangement used to exchange data. For example, network 190 may be the Internet, a private data network, virtual private network using a public network, and/or other suitable connection(s) that enables the components of system 100 to send and receive information. Network 190 may also include a public switched telephone network ("PSTN") and/or a wireless network such as a cellular network, wired Wide Area Network (WAN), WiFi network, or other known wireless network (e.g., WiMAX) capable of bidirectional data transmission.

Secure server 140 may include one or more computer-based systems including computer system components, desktop computers, workstations, tablets, hand held computing devices, memory devices, and/or internal network(s) connecting the components. In some embodiments, secure server 140 may be enabled for cloud computing. Secure server 140 may include a physical and/or virtual storage system associated with cloud storage for storing data and providing access to data via network 190. Secure server 140 may include cloud services such as those offered by, for example, Amazon®, Apple®, Cisco®, Citrix®, IBM®, Joyent®, Google®, Microsoft®, Rackspace®, Salesforce.Com®, and Verizon®/Terremark®, or other types of cloud services accessible via network 190. In some embodiments, secure server 140 comprises multiple computer systems spanning multiple locations and having multiple databases or multiple geographic locations associated with a single or multiple cloud storage services.

As used herein, secure server 140 refers to physical and virtual infrastructure associated with a single cloud storage service. In some embodiments, secure server 140 manages and/or stores data in secure memory 144. In addition, secure server 140 may be owned and/or operated by an entity responsible for issuing (e.g., creating or authorizing the creation of) public terminal 110 and maintaining one or more accounts associated with public terminal 110. In some embodiments, secure server 140 is associated with one or more of membership facilities, such as fitness centers, government organizations, such as state governments or departments of motor vehicles, banks, credit card companies, hospitals, hotels, or any other entities that may manage and/or maintain devices such as public terminal 110, and/or maintain one or more accounts. In some embodiments, secure server 140 may be configured to authenticate a public terminal 110 or user device 160 based on one or more known authentication techniques before providing configuration data or other information, such as a security key of the disclosed embodiments, to the public terminal 110 and/or user device 160.

Secure server 140 may include secure processor 142 and secure memory 144. Secure processor may be a processor, such as those previously described for processor 112 of public terminal 110 and processor 162 of user device 160. Secure memory 144 may include one or more memory devices that store data and instructions used to perform one or more aspects of the disclosed embodiments. In some aspects, components of system 100 (shown and not shown) may be configured to receive, obtain, gather, collect, generate, or produce information to store in secure memory 144. For example, in some embodiments, secure memory 144 may store information, such as one or more pairing configurations for the secure pairing associated with public terminal 110, user device 160, and/or secure server 140. Secure memory 144 may also include any combination of one or more databases controlled by memory controller devices (e.g., other server(s), etc.) or software, such as document management systems, Microsoft™ SQL databases, SharePoint™ databases, Oracle™ databases, Sybase™ databases, or other relational databases. In some embodiments, secure memory 144 may comprise an associative array architecture, such as a key-value storage, for storing and rapidly retrieving large amounts of information about an individual.

System 100 may include firewall 150. In some embodiments, secure server 140 may connect to network 190 using firewall 150. Firewall 150 may monitor and control incoming and outgoing network traffic based on predetermined security rules. Firewall 150 may act as a barrier between a trusted internal network and untrusted external network. In an example, network 190 may be an untrusted external network, such as the Internet, and firewall 150 may act as a barrier to selectively separate network traffic of network 190 from secure server 140. For example, firewall 150 may include packet filtering, stateful filters, proxy servers, network address translation, and/or application-level firewalls.

Figure 2:
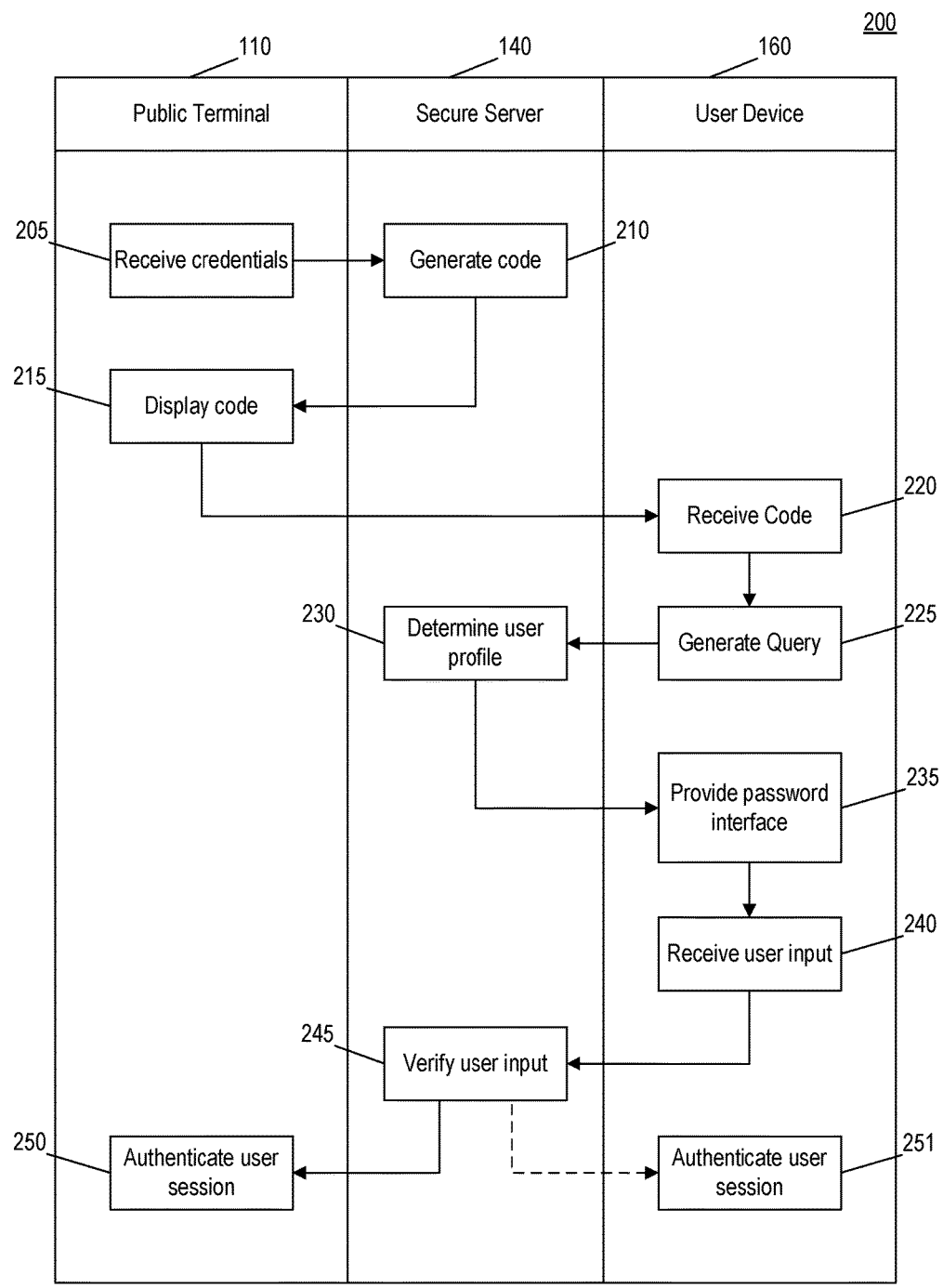
FIG. 2 is a flowchart of an example process for securely authenticating a user at a public terminal, consistent with disclosed embodiments.

FIG. 2 shows a flowchart of an example process 200 for authenticating a user to use a public terminal, consistent with the disclosed embodiments. In the following description, reference is made to certain components of FIG. 1 for purposes of illustration. For example, FIG. 2 may depict process 200 with method steps shown corresponding to one or more of public terminal 110, secure server 140, and user device 160. It should be appreciated, however, that other implementations are possible and that components other than those illustrated above in FIG. 1.

At step 205, process 200 may receive credentials. Public terminal 110 may receive one or more user credentials. For example, a card reader 126 may receive a physical user credential, such as a magnetic strip card, a strip and chip card, an RFID card, and/or an NFC card. The physical user credential may be associated with a user. In some embodiments, public terminal 110 may receive a personal identification code associated with the physical user credential. For example, keypad 124 of public terminal 110 may receive a numeric PIN or alphanumeric password from a user.

At step 210, process 200 may generate a mobile device code. In some embodiments, system 100 may generate a mobile device code based on the physical user credential. Additionally, the mobile device code may be based on a personal identification code associated with the physical user credential (e.g., a user PIN) and/or an identifier of public terminal 110. For example, system 100 may perform a hash function using a numerical identifier associated with the physical user credential. In other examples, the hash function may also use the personal identification code associated with the physical user credential and/or the identifier of the public terminal.

As shown in FIG. 2, public terminal 110 may transmit credential information for remote processing, in some embodiments. Public terminal 110 may transmit the physical user credential, an associated personal identification code (e.g., PIN), and/or the public terminal identifier to secure server 140 (e.g., using network 190). Based on the received information, secure server 140 may generate the mobile device code. For example, secure server 140 may perform a hash function using the received information.

Although not shown in FIG. 2, in some embodiments, public terminal 110 may perform step 210. For example, public terminal 110 may generate a mobile device code by performing a hash function using the physical user credential, an associated personal identification code (e.g., PIN), and/or the public terminal identifier. If needed, public terminal 110 may share the determined mobile device code with secure server (e.g., transmit the mobile device code over network 190). Example situations where secure server 140 may need to receive the determined mobile device code may include situations where secure server is needed to serve as a secure neutral location to provide access to the mobile device code to other devices, systems, or applications. For example, system 100 may use a separate server or process to verify the mobile device code after it has been generated (e.g., to determine whether the mobile device code is corrupted). However, the separate server or process may not be able to access public terminal 110. To allow such processes or servers to access the mobile device code, public terminal may transmit the mobile device code to secure server to store (e.g., in a database).

The mobile device code may be based on one or more of the physical user credential, an associated personal identification code (e.g., PIN), and the public terminal identifier to secure server 140 (e.g., using network 190). For example, the mobile device code may be based on an identifier encoded on a physical user credential and a numerical identifier unique to public terminal 110. In other examples, the mobile device code may be solely based on the physical user credential or an identifier of public terminal 110. The public terminal identifier may include one or more of the MAC address of the public terminal, an identifier of the public terminal registered with an institution, a representation of the physical location of the public terminal (e.g., GPS coordinates, a ZIP code, and/or a street address), a building associated or co-located with the public terminal (e.g., Cotswald Public Library), and the like. In the context of security-clearance-based computer terminals, the mobile device code may be based on a numerical identifier encoded on a CAC card and a unique identifier of the secure terminal. In the context of financial institutions, public terminal 110 may be an ATM, and the mobile device code may be based on the debit or credit card number (e.g., encoded on a magnetic strip or chip), a user-entered PIN (if required), and the location of the ATM.

The mobile device code may be generated using a mathematical function. In some embodiments, system 100 (e.g., public terminal 110, secure server 140) may perform a one-way function (e.g., a hash function) on the data on which the mobile device code is based. For example, the hash function may operate on one input, and all the data on which the mobile device code is based may be combined into a single numerical value to provide to the hash function. In this example, the values may be added, multiplied, concatenated together, or any other mathematical function that operates on the number of values at issue to form a single value. In another example, the hash function may be a multi-input function performed on two or three numerical inputs to produce a single value. When the data includes alphabetic letters (e.g., an alphanumeric PIN, the street name for a public terminal location, and the like), system 100 may translate the letters into number forms. For example, system 100 may use the ASCII values associated with the letters to generate the mobile device code.

The mobile device code may take different forms. As discussed above, the mobile device code may be initially generated as a numerical value. System 100 may use that value to provide the mobile device code in another form. In an embodiment, the mobile device code may include a visual encoded symbol. For example, system 100 may generate a Quick-Response (QR) code using the numerical value. In other examples, the mobile device code may be encoded as an Infrared signal, sound (e.g., frequency modulation), thermal energy, vibrations, pulses of air, or the like.

At step 215, process 200 may display a mobile device code. In some embodiments, public terminal 110 may display the mobile device code on display 132. For example, public terminal 110 may send a signal to display a QR code on an LCD display.

While the term "display" is used, when the mobile device code does not form a visual representation, other ways to provide the mobile device code may be used. Output devices 130 may include additional devices capable of providing the mobile device code to another device (e.g., user device 160). For example, when the mobile device code is represented by a sound, output devices 130 may include a speaker, a digital audio transmitter, and/or a frequency modulation transmitter, which may be used by public terminal 110 to provide the mobile device code. In the example of a thermal energy mobile device code, a thermoelectric power generator, fan, infrared laser, and the like may be used by public terminal 110 to provide the mobile device code. In the example of the mobile device code being vibrations, public terminal 110 may provide the mobile device code using a motor, such as a Pico Haptic™ shaftless vibration motor. In the example of the mobile device code being pulses of air, public terminal 110 may use a fan and/or an air compressor to provide the mobile device code. Output devices 130 may include these additional example devices and other output mechanisms to provide the mobile device code to other devices (e.g., user device 160).

When the mobile device code is generated by secure server 140 (as shown in FIG. 2), secure server 140 may transmit the mobile device code to public terminal 110. For example, secure server 140 may packetize the mobile device code and transmit it over network 190 to public terminal 110. Secure server 140 may encrypt the mobile device code prior to transmitting it (e.g., using public-private key encryption, and the like). In this example, public terminal 110 may decrypt the mobile device code and provide it.

At step 220, process 200 may receive a mobile device code. User device 160 may receive the mobile device code from public terminal 110. In the example of a QR code, camera 172 of user device 160 may capture the QR code as it is displayed by public terminal 110 (e.g., using display 132). In still other examples, input devices 170 may include additional sensors capable of detecting the mobile device code as public terminal 110 provides it. In the example of a mobile device code provided by infrared transmitter 134 of public terminal 110, infrared receiver 176 of user device 160 may receive the mobile device code encoded as an infrared signal. In still other example, where public terminal 110 provides the mobile device code using sound, thermal energy, vibrations, and/or pulses or air, input devices 170 of user device 160 may include addition hardware capable of sensing and receiving the mobile device code. For example, input devices may include a microphone, temperature sensor (e.g., thermocouple, thermally sensitive resistor, infrared temperature sensor, and the like), vibration sensor(s), and/or air pulse sensors (e.g., airflow sensors, air pressure sensors, and the like), respectively.

At step 225, process 200 may generate one or more queries. User device 160 may generate a message to provide the mobile device code to secure server 140. The message may include a request for a user profile. For example, after capturing an image of the QR code, user device 160 may transmit the image through network 190 to secure server 140 as a request to receive a user profile corresponding to the mobile device code (which may be based on the physical user credential). In other embodiments, user device may translate the mobile device code signal as a numerical sequence to include in the user profile request. For example, regardless of the mechanism used to provide the mobile device code to user device 160 (e.g., sound, light, pulses of air, infrared, and the like) user device may convert that mobile device code signal to be a numeric sequence and transmit it to secure server.

In some embodiments, user device 160 may transmit the scanned input to secure server 140 with a security key indicating that user device 160 is a trusted device. The security key may be used as a hash key input to cryptographically encode the scanned input. For example, mobile device 160 may perform a hash function on data to be transmitted to secure server 140 using the security key. Secure server 140 may use an inverse key to decrypt the data, ensuring that the data came from a trusted device. In other examples, mobile device 160 may transmit the security key along with data to secure server 140.

The security key may have been previously transmitted from secure server 140 to user device 160. Prior to step 225, or prior to process 200, secure server 140 may have interacted with user device 160 in order to verify that user device 160 is a trusted device (e.g., user device 140 is a device of user that has an account with secure server 160). For example, secure server may transmit a temporary code to user device 160, which a user may provide and transmit back to secure server 140 using a known secure portal (e.g., application, website, web application). Once registered with secure server 140, secure server 140 may transmit a security key to user device 160 which, when presented with a transmission from user device 160 to secure server 140, enable secure server 140 to recognize that the transmission comes from a verified trusted device.

At step 230, process 200 may determine a user profile. Secure server 140 may look up a user profile based on the mobile device code. For example, secure server 140 may use the mobile device code as a key in a lookup table to determine a user profile identifier or the profile itself. In the context of a QR code being the mobile device code, secure server 140 may derive a numeric sequence based on the QR code and use the numeric sequence as a key in the lookup table. In some embodiments, secure server may receive the mobile device code as a numeric sequence. For example, secure server 140 may receive a numeric sequence as payload of the request for the user profile. The numeric sequence itself may act as the key to a lookup table to determine the user profile.

In some embodiments, step 230 may only occur when secure server 140 recognizes user device 160 as a trusted device. Secure server 140 may check the value of the security key provided by user device 160 in its request for the user profile. For example, secure server 160 may determine whether the security key matches a stored key. In an example, the security key may be a private key that user device 160 uses to hash the QR code (or other mobile device code) (e.g., to produce a digital signature), and secure server 140 may verify that the data is authentic by using a corresponding public key to the private key issued to user device 160 to decrypt the data.

Once process 200 determines the user profile, it may transmit it to user device 160. In some embodiments, secure server may retrieve a user profile in memory and transmit it over network 190 to user device 160. For example, secure server may use the profile identifier from a lookup table to retrieve the user profile from a database (e.g., a local database, a remote database, a RAID array, cloud storage, and the like). In this example, secure server 140 may packetize the user profile and transmit the packets to user device 160.

At step 235, process 200 may provide a password interface. When user device 160 receives the user profile from secure server 140, user device may use the profile to generate a password interface. In some embodiments, the profile may include a field to determine a type of password interface to provide to the user. For example, the profile may identify that the user device should provide one of numeric or alphanumeric entry fields, pattern entry fields, image selection fields, and the like. In the context of a financial system, an application issued by a financial instruction may run on user device 160. The financial institution's application may determine a password interface within the application graphical user interface (GUI) based on an identifier in the received user profile.

At step 240, process 200 may receive user input. User device 160 may receive user input at the password interface. For example, input device 170 (e.g., touchscreen 174) of user device 160 may detect user strokes or taps entering data using the password interface. User device 160 may record the user input at the password interface and provide it to secure server 140 for verification.

At step 245, process 200 may verify user input. Secure server 140 may receive user password interface input from user device 160 and determine whether it matches the user's password input. For example, secure server 140 may perform a hash function (e.g., a one-way function) on the user password interface input (or receive a hash of the user password interface input produced by user device 160). Secure server 140 may determine whether the hash matches a stored hash value for the user profile transmitted to user device in step 230.

At step 250 and/or step 251, process 200 may authenticate a user's session. Responsive to verifying the user input at the password interface, secure server 140 may transmit a signal to public terminal 110, user device 160, or both indicating the user's identity has been verified. In some embodiments, secure server 140 may also include authorization information, such as permissions for the user (e.g., data or applications the user can access). In other embodiments, public terminal 110 and/or user device 160 may be able to locally determine what the user is authorized to do based on the user authentication received from secure server 140. For example, public terminal 110 and/or user device 160 may be able to determine which programs or data the user can access and operate.

In some embodiments, process 200 may include step 250. Secure server 140 may transmit a signal to public terminal 110 to authenticate the user. The authentication message may include instructions indicating that the user is authorized to use public terminal 110. For example, secure server 140 may transmit a signal causing public terminal 110 to remove a lock screen and present a user with a user interface to operate public terminal 110. The instructions from secure server 140 may include instructions to provide a personalized user interface based on a user profile for a user to use at public terminal 110. For example, the instructions may identify certain user data and/or specific programs for the user to make use of at public terminal 110. In the example of public terminal 110 being a computer with security clearance restrictions, the instructions may indicate certain classified data and/or application to which public terminal 110 should permit access. In the example of public terminal 110 being an ATM, the instructions may include details of the user account with the financial institution.

In an embodiment, process 200 may include step 251. Secure server 140 may transmit a signal to user device 160, authenticating the user's identity and authorizing the user to operate public terminal 110. For example, secure server 140 may transmit a signal indicating that user device 160 is authorized to control and/or interact with public terminal 110 based on the authenticated user. In this example, user device 160 may present a user interface which allows a user to interact with data or programs of public terminal 110, control public terminal 110, allow remote access to public terminal 110, and the like. In the context of public terminal 110 being in a security clearance environment, secure server 140 may transmit an authentication message to user device 160 which may include instructions that the authenticated user is authorized to access classified data stored at public terminal 110. In the context of public terminal 110 being an ATM, secure server 140 may transmit a message to user device 160 authenticating the user, the message including authorized permissions for the user. The authorized permissions may include instructions to provide a GUI to allow the user device 160 to control or provide commands to public terminal 110. In this example, user device 160 may present a GUI to allow the user to request currency from public terminal 110, and in return, public terminal 110 may dispense currency and provide a receipt.

Figure 3:
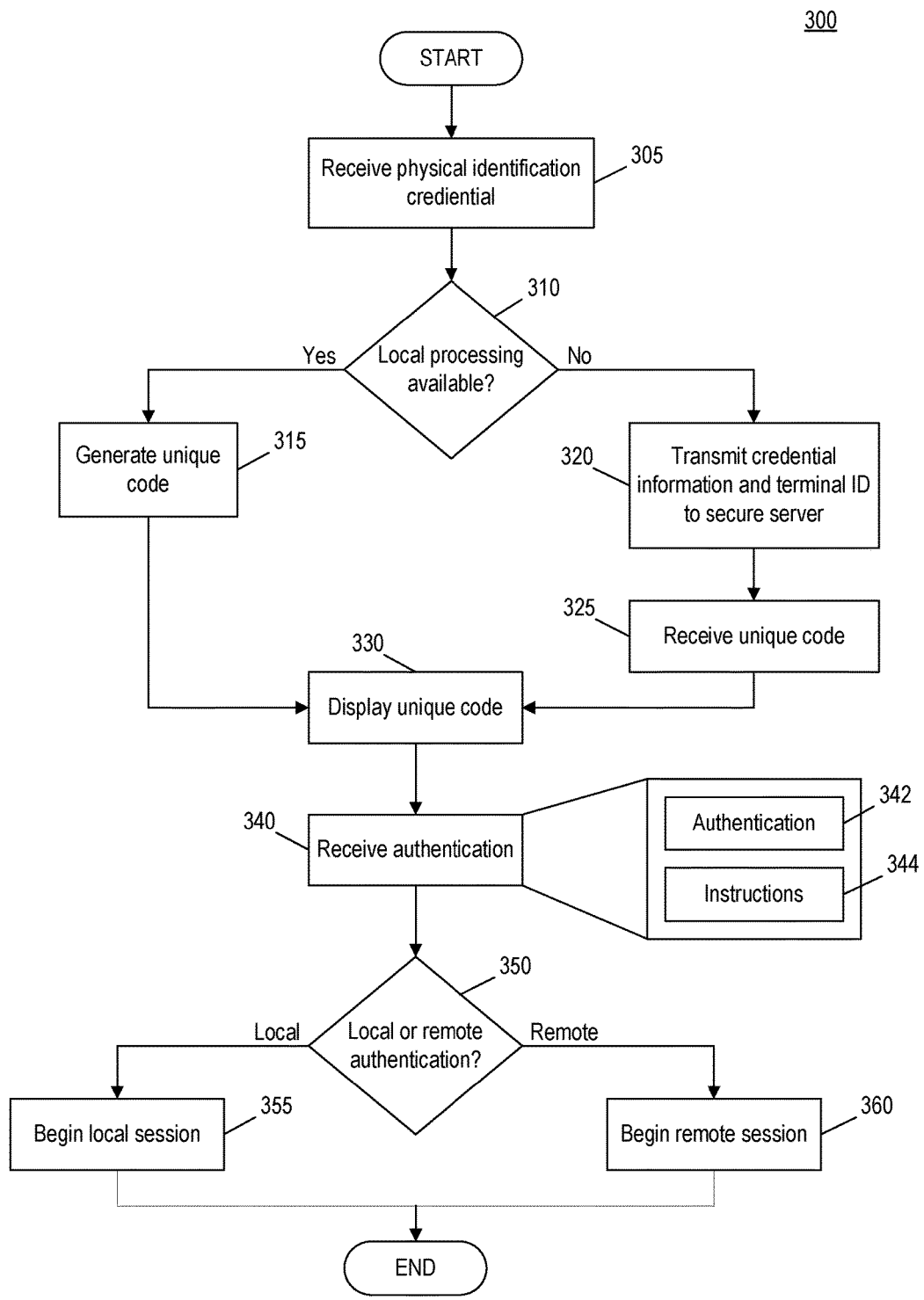
FIG. 3 is a flowchart of an example process for securely authenticating a user at a public terminal, consistent with disclosed embodiments.

FIG. 3 shows a flowchart of an example process 300 for authenticating a user at a public terminal, consistent with the disclosed embodiments. In the following description, reference is made to certain components of FIG. 1 for purposes of illustration. For example, FIG. 3 may depict process 300 with method steps shown corresponding to one or more of public terminal 110, secure server 140, and user device 160. It should be appreciated, however, that other implementations are possible and that components other than those illustrated above in FIG. 1.

At step 305, process 300 may receive credentials. Public terminal 110 may receive a physical user credential. For example, public terminal 110 may perform functions as those described regarding step 205 of FIG. 2.

At step 310, process 200 may determine whether local processing is available. Public terminal 110 may determine whether it may locally determine a unique mobile device code. Whether public terminal 110 may locally determine a mobile device code may depend on one or more of network connectivity, local processing capability, remote processing capability, and/or security concerns. With regard to network connectivity, public terminal may determine that local processing is needed due to the lack of a network connection, network traffic rising above a predetermined threshold, and/or available network bandwidth falling below a predetermined threshold. Regarding local processing capabilities, public terminal 110 may determine whether it has the processing power and/or software needed to generate the code. For example, public terminal 110 may determine whether it has a particular application or version of an application installed, whether it has hardware (e.g., processor, memory) that is on an approved list of hardware for locally generating a mobile device code. Regarding remote processing capability, public terminal 110 may determine whether a remote server is available to generate the mobile device code remotely. For example, public terminal 110 may determine whether secure server 140 is active, busy, or available. If secure server 140 is active and available, public terminal 110 may determine that remote processing is not needed and therefore not available. Regarding security concerns, public terminal 110 may determine whether security concerns exist, such that secure server 140 should generate the mobile device code to ensure that the mobile device code is generated in a secure computing environment. For example, public terminal 110 may determine that local processing is not available when it determines that local activity matches predetermined patterns of suspicious activity or whether public terminal determines that it is located in a geographic location corresponding to a region identified as a security risk in a database. Example predetermined patterns of suspicious activity may include excessively failed password attempts, using an incorrect profile, providing an incorrect mobile device code, using an incorrect trusted device key, etc. In the context of public terminal 110 being an ATM, suspicious activity may include requests for withdrawal of currency exceeding a predetermined amount.

If local processing is available (e.g., step 310, "yes"), process 300 may proceed to step 315. At step 315, process 300 may generate a unique mobile device code. For example, public terminal 110 may generate a mobile device code as described in step 210 of FIG. 2. If local processing is not available (e.g., step 310, "no"), process 300 may proceed to step 320 and step 325. At step 320, process 300 may transmit credential information and a terminal identifier to a server. For example, public terminal 110 may transmit information (e.g., one or more of a physical user credential, an associated personal identification code, or the public terminal identifier) to secure server 140, and secure server 140 may generate a mobile device code and transmit the mobile device code back to public terminal 110 as described in step 210 of FIG. 2.

At step 330, process 300 may display a mobile device code. Public terminal 110 may present the mobile device code using one or more mechanisms. For example, public terminal may display a QR code as described in step 215 of FIG. 2 and/or perform any other presentation mechanism available or necessary to provide the mobile device code to user device 160.

At step 340, process 300 may receive an authentication message. Public terminal 110 may receive an authentication message from secure server 140. For example, public terminal 110 may receive a message over network 190 authenticating it for use by a user as described in step 245 of FIG. 2.

In embodiments, the authentication may include authentication data 342 and/or instructions 344. Authentication data 342 may include a value or identifier indicating to public terminal 110 that the user identify has been verified, causing public terminal 110 to provide access to programs or data. Instructions 344 may include one or more functions for public terminal 110 to perform. For example, public terminal 110 may receive instructions to automatically perform a function upon receiving the authentication. Instructions 344 may include launching one or more applications, logging a timestamp, and/or prompting the user with a particular GUI. In the context of public terminal 110 being an ATM, instructions 344 may include an instruction to automatically dispense a predetermined amount of currency. In some embodiments, instructions 344 may include instructions to end process 300. For example, process 300 may end after the completion of predetermined functions dictated by instructions 344.

At step 350, process 300 may determine whether the authentication authorizes a local session or a remote session. Public terminal 110 may determine the type of authorization based on the authentication data 342 received in step 340. When authentication indicates that a local session should commence (e.g., step 350, "local"), process 300 may proceed to step 355. At step 355, process 300 may begin a local session. For example, public terminal may perform functions as described in step 250 of FIG. 2. When authentication dictates that a remote session should begin (e.g., step 350, "remote"), process 300 may proceed to step 360. At step 360, process 300 may being a remote session. Public terminal 110 may be available to control by user device 160. For example, public terminal 110 may operate as described in step 251 of FIG. 2. Once the remote or local session is complete, process 300 may end.

Figure 4:
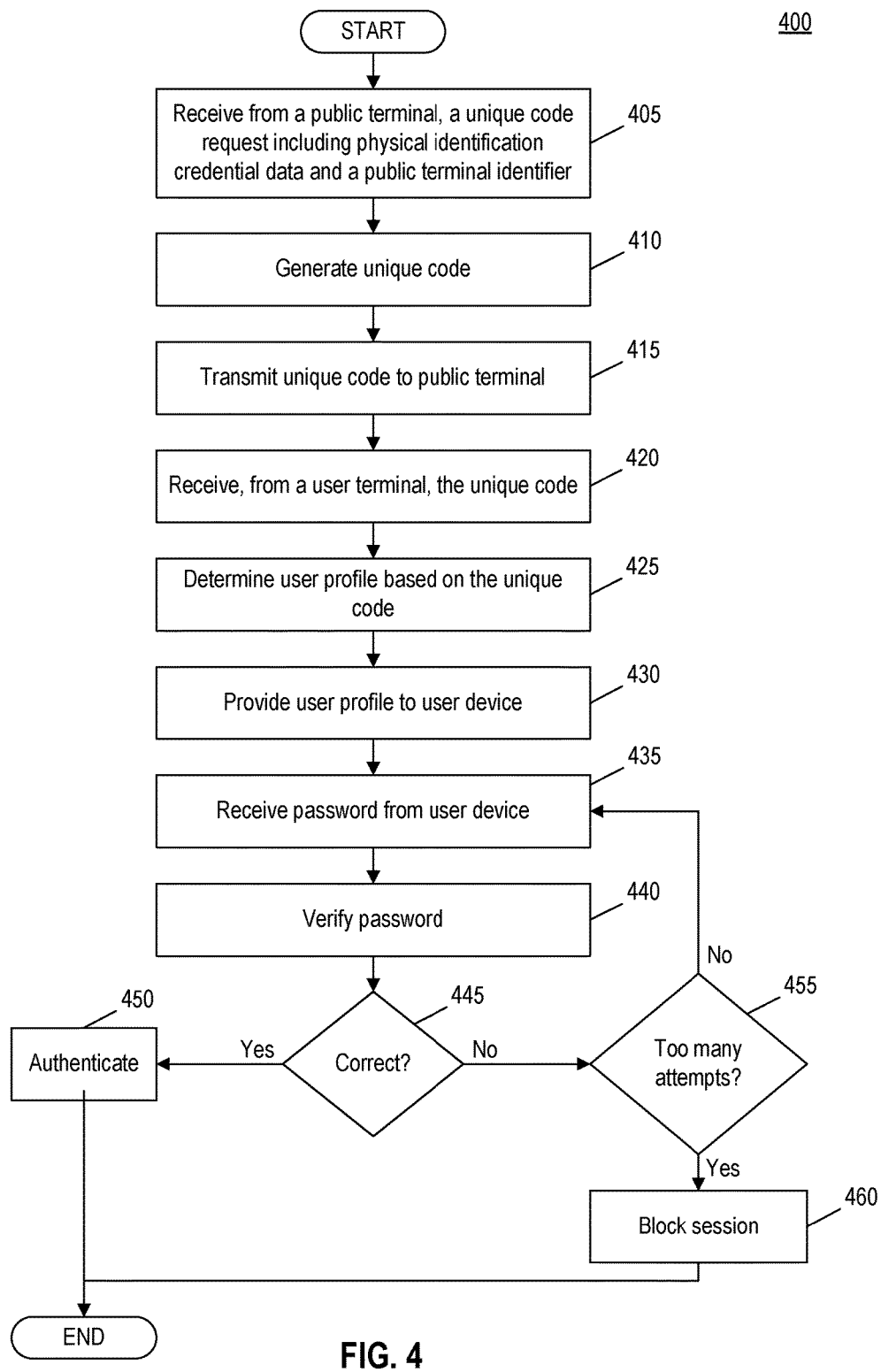
FIG. 4 is a flowchart of an example process for securely authenticating a user at a public terminal, consistent with disclosed embodiments.

FIG. 4 shows a flowchart of an example process 400 for authenticating a user at a public terminal, consistent with the disclosed embodiments. In the following description, reference is made to certain components of FIG. 1 for purposes of illustration. For example, FIG. 4 may depict process 400 with method steps shown corresponding to one or more of public terminal 110, secure server 140, and user device 160. It should be appreciated, however, that other implementations are possible and that components other than those illustrated above in FIG. 1.

At step 405, process 400 may receive a request for a mobile device code. Secure server 140 may receive information to generate a mobile device code. For example, secure server may receive one or more of a physical user credential, an associated personal identification code (e.g., PIN), and/or the public terminal identifier, as discussed in relation to step 205 of FIG. 2.

At step 410, process 400 may generate a mobile device code. Secure server 140 may generate a mobile device code. For example, secure server 140 may perform functions as described in step 210 of FIG. 2 to generate a mobile device code. At step 415, process 400 may transmit a mobile device code. Secure server 140 may transmit the generated mobile device code to public terminal 110. For example, secure server 140 may transmit a QR code or other coding type, such as those previously described in step 210, to public terminal 110.

At step 420, process 400 may receive the mobile device code. Secure server 140 may receive a mobile device code from user device 160. For example, secure server 140 may receive a photograph of a QR code from user device 160. In other examples, secure server 140 may receive other types of mobile device codes previously described in step 220 of FIG. 2. in some embodiments, secure server 140 may receive the mobile device code as part of a request, such as a request for a user profile, as described in step 225 of FIG. 2.

At step 425, process 400 may determine a user profile. Secure server 140 may identify a user profile using a mobile device code. For example, secure server 140 may determine a user profile as described in step 230 of FIG. 2. Also, as described in step 230, secure server 140 may verify that the user profile request comes from a trusted device (e.g., the request uses a trusted device security key) in step 425. At step 430, process 400 may provide a user profile. Secure server 140 may send the user profile to user device 160 using network 190. For example, secure server 140 may transmit a profile as described in step 230 and step 240 of FIG. 2.

At step 435, process 400 may receive password input. Secure server 140 may receive password input data from user device 160. For example, secure server 140 may receive one or more packets including payload data representing the input provided by a user at a password interface presented at user device 160, as described in step 240 of FIG. 2.

At step 440, process 400 may verify a password. Secure server 140 may determine whether the received password information matches stored password information. For example, secure server 140 may perform functions as described in step 245 of FIG. 2. At step 445, process 400 may determine whether the password is correct. Secure server 140 may determine whether it was able to verify the password. When verification either cannot be completed, results in a failed verification, or determines a mismatch between provided and stored password data, secure server 140 may determine that the password is not correct. If the received password data matches the store password data, secure server may determine that the password is correct.

When the password is correct (e.g., step 445, "yes"), process 400 proceeds to step 450. At step 450, process 400 may authenticate a user for a given session. Server 140 may transmit a message authenticating a user's identity for a session at the public terminal as described in step 250 and/or step 251 of FIG. 2. Also, the authentication message may include authentication data 342 and/or instructions 344 as described in step 340 of FIG. 3.

When the password is incorrect (e.g., step 445, "no"), process 400 proceeds to step 455. At step 455, process 400 may determine whether password attempts exceed a threshold number of attempts. Secure server 140 may count the number of failed password attempts. For example, secure server 140 may increment a number when the password is incorrect (e.g., step 445, "no"). When the count exceeds a predetermined number of attempts, secure server 140 may determine that suspicious activity is occurring. For example, once secure server 140 determines that the wrong password input has been provided five times, secure server may determine that too many failed attempts have occurred. In some embodiments, secure server 140 may verify that password input is provided using a trusted device security key, such as that used to transmit a request for a user profile, as described in step 425. When the password input is received by secure server 140 without using the security (e.g., the password input is not hashed with the security key, the password is not transmitted with the security key), secure server 140 may count that as a failed password attempt or deem that too many passwords have been attempted.

When too many attempts have yet to occur (e.g., step 455, "no"), process 400 returns to step 435, which is described above. When too many attempts have occurred (e.g., step 455, "yes"), process 400 proceeds to step 460. At step 460, process 400 may block a session. Secure server 140 may send a signal to public terminal 110 and/or user device 160 indicating that no authentication will be given. After authentication occurs (step 450) or blocking occurs (step 460), process 400 may end.

Figure 5:
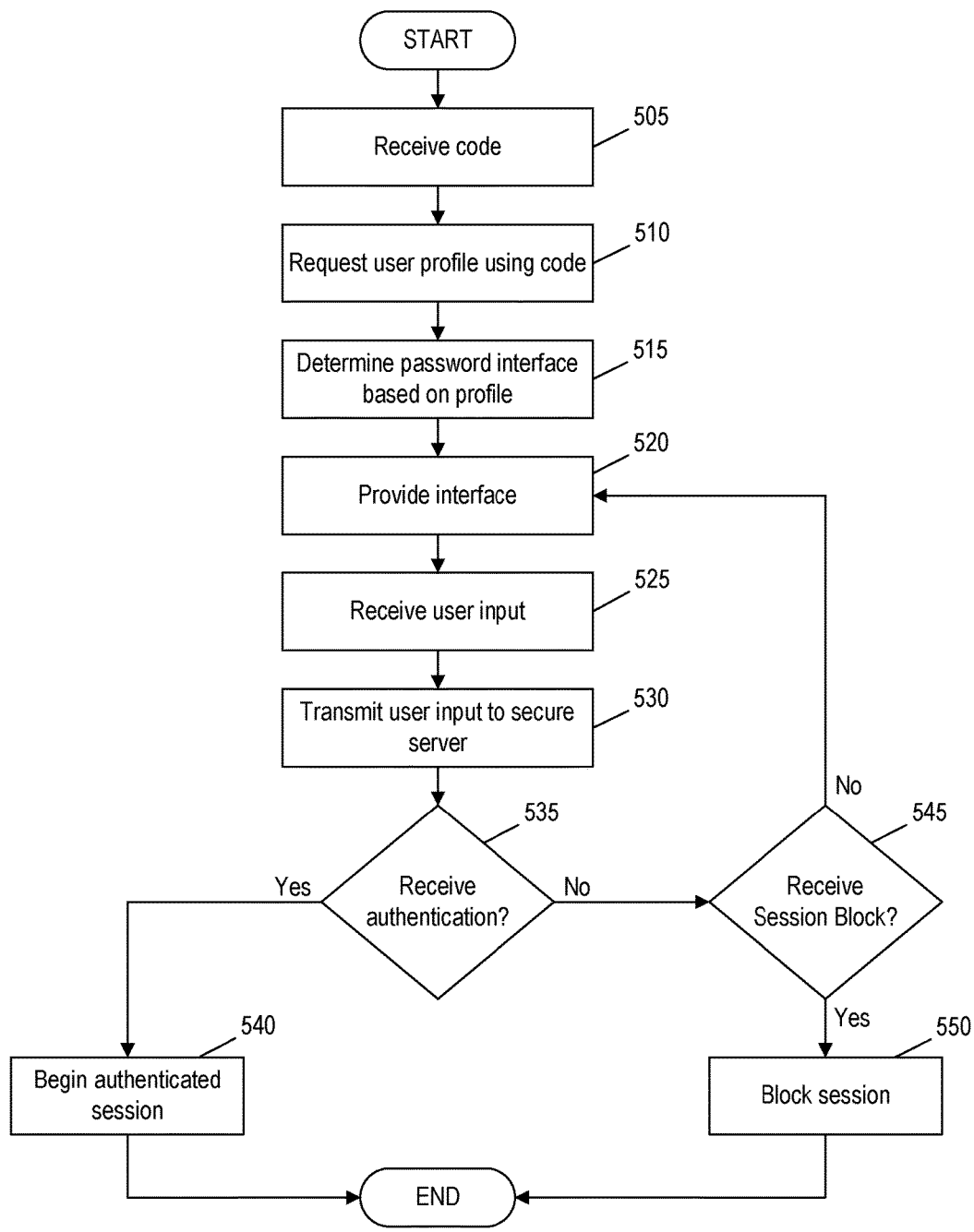
FIG. 5 is a flowchart of an example process for securely authenticating a user at a public terminal, consistent with disclosed embodiments.

FIG. 5 shows a flowchart of an example process 500 for authenticating a user at a public terminal, consistent with the disclosed embodiments. In the following description, reference is made to certain components of FIG. 1 for purposes of illustration. For example, FIG. 5 may depict process 500 with method steps shown corresponding to one or more of public terminal 110, secure server 140, and user device 160. It should be appreciated, however, that other implementations are possible and that components other than those illustrated above in FIG. 1.

Although not depicted in FIG. 5, process 500 may begin with unlocking user device 160. User device 160 may present an authentication screen that must be successfully completed prior to using any or most of the functionality of user device 160. For example, user device 160 may require the user to enter a PIN, provide an alphanumeric password, scan one or more fingerprints, and/or complete facial recognition before granting access to certain functionality and/or applications of user device 160. Other authentication mechanisms may be used as described in this disclosure, including other biometric authentication mechanisms. Once authentication is complete, user device 160 may be unlocked.

At step 505, process 500 may receive a mobile device code. User device 160 may capture a mobile device code. For example, user device 160 may sense and store a mobile device code as described in step 220 of FIG. 2. At step 510, process 500 may request a user profile. User device 160 may transmit a request to secure server 140 for a user profile. For example, user device 160 may transmit a message as described in step 225 of FIG. 2.

At step 515, process 500 may determine a password interface, and at step 520, process 500 may provide a password interface. In these steps, user device 160 may receive a user profile from secure server 140, determine a password interface based on the user profile, and present the password interface. For example, user device 160 may identify a password interface and provide the password interface using one or more of output devices 180 as described in step 235 of FIG. 2.

At step 525, process 500 may receive user input. User device 160 may receive user selections or strokes corresponding to data entry at the password interface. For example, user device 160 may perform functions as described in step 240 of FIG. 2.

At step 530, process 500 may transmit user input. User device may transmit the password user interface input to secure server 140 as described in step 245 of FIG. 2. At step 535, process 500 may determine whether an authentication message has been received. User device 160 may determine whether it has received an authentication message from secure server 140, as described in step 245 of FIG. 2. The authentication may include authentication data 342 and/or instructions 344 as described in step 340 of FIG. 3

When the authentication message is received (e.g., step 535, "yes"), process 500 proceeds to step 540. At step 540, process 500 may begin an authenticated session. For example, user device 160 and/or public terminal 110 may begin a session as described in step 250 and step 251 of FIG. 2. When the authentication message is not received (e.g., step 535, "no"), process 500 proceeds to step 545. At step 545, process 500 may receive a session block. User device 160 may receive a message from secure server 140 indicating that the session is blocked, as described in step 460 of FIG. 4.

When no session block is received (e.g., step 545, "no"), process 500 returns to step 520. User device 160 may provide the password interface for a subsequent attempt at receiving password input. When a session block is received (e.g., step 545, "yes"), process 500 proceeds to step 550. At step 550, process 500 may block a session. User device 160 may no longer present the password user interface to prevent additional attempts at password entry. For example, user device 160 may present a message indicating that too many failed passwords have been entered. In some embodiments, secure server 140 may perform blocking by, for example, blocking use of the trusted device security key and/or the mobile device code. After the authenticated session is complete (step 540) or blocking occurs (step 550), process 500 may end.

Figure 6A:
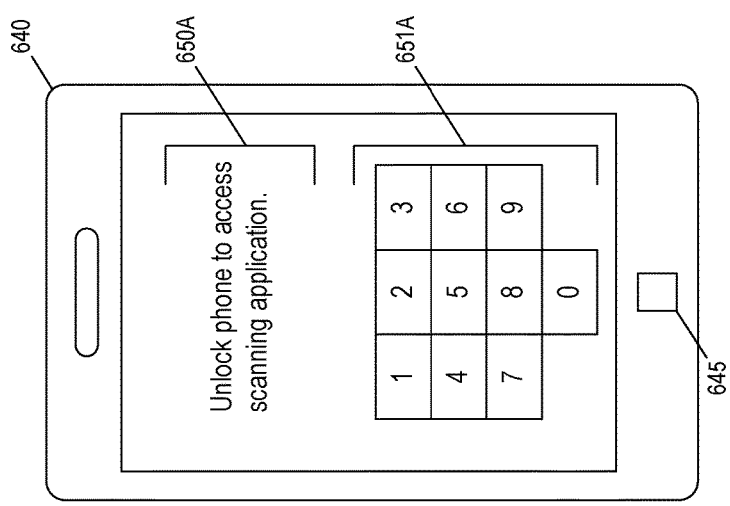
FIGS. 6A, 6B, and 6C each depict an example implementation for updating a process for pairing devices for securely authenticating a user at a public terminal, consistent with disclosed embodiments.
Figure 6B:
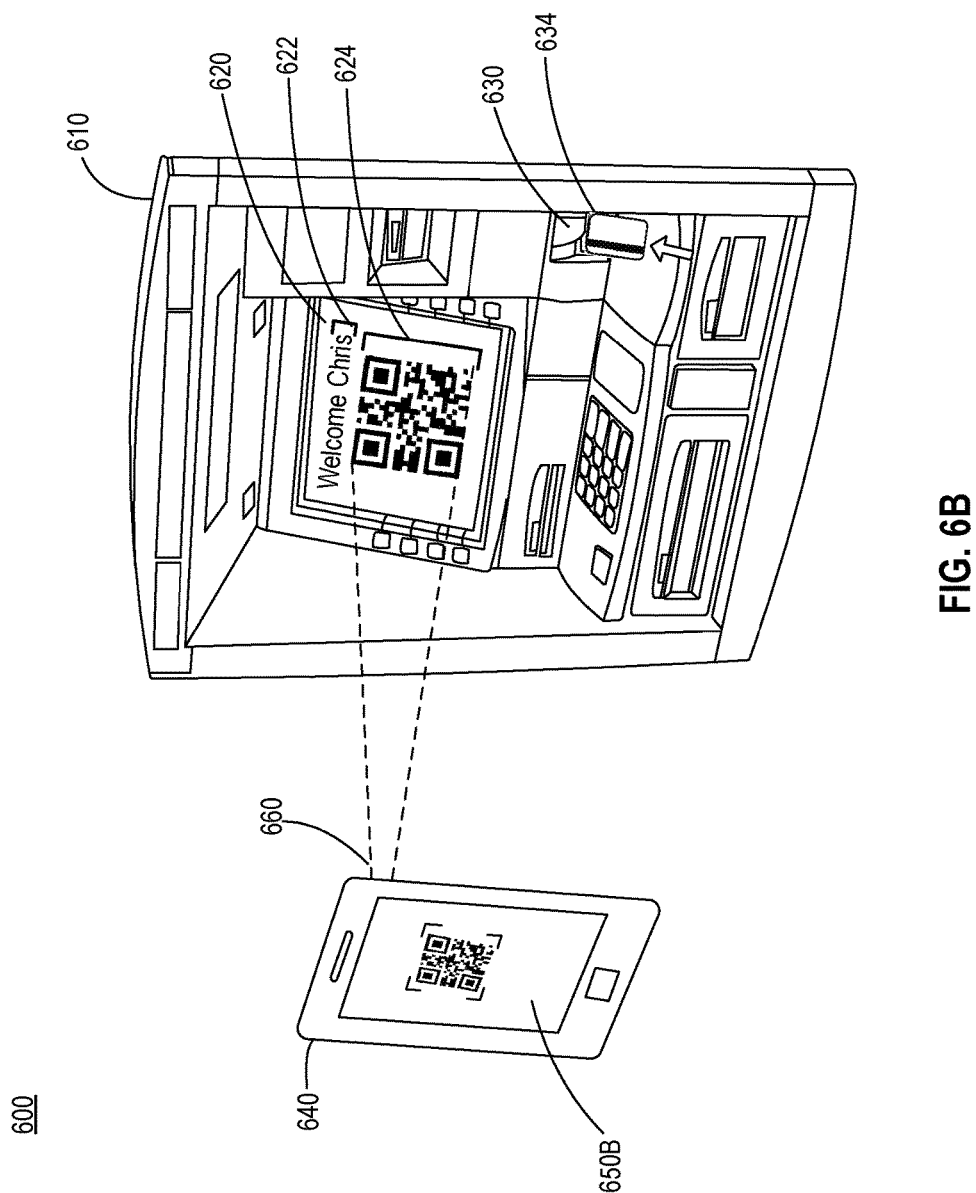
Figure 6C:
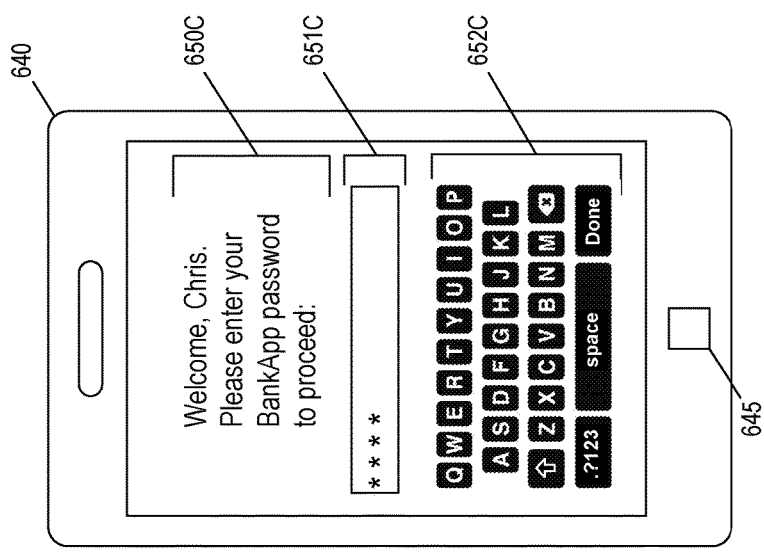

FIGS. 6A, 6B, and 6C depict an example implementation for updating a process for pairing devices for securely authenticating a user at a public terminal, consistent with disclosed embodiments.

FIG. 6A depicts mobile device 640, including fingerprint sensor 645 and a display. The display may be a touchscreen providing narrative GUI region 650A and input GUI region 651A. Mobile device 640 may be an example user device 160. Also, Fingerprint sensor 645 and/or input GUI region 651A may correspond to unlocking mechanisms of a user device. As described in FIG. 5, unlocking user device 160 may begin process 500. Although not depicted in FIG. 2, unlocking user device 160 (e.g., as shown in FIG. 6A) may also precede step 220 of process 200.

FIG. 6B depicts example system 600, including mobile device 640 and ATM 610. A previously discussed, mobile device 640 may be an example of user device 160, and ATM 610 may be an example of public terminal 110. As shown, mobile device 640 may include mobile device code capture GUI region 650B and camera 660 (e.g., camera 172).

ATM 610 may include display 620 (e.g., display 132) and card reader 630 (e.g., card reader 126). In some embodiments, display 620 may include narrative GUI region 622 and QR code region 624, and card reader 630 may receive credit card 634 (an example physical identification credential). As shown, mobile device 640 may capture an image of QR code region 624 using camera 660. This may depict an example implementation of step 215 and step 220 of process 200, step 330 of process 300, and/or step 505 of process 500.

FIG. 6C depicts example mobile device 640. As shown, mobile device 640 may include a display (e.g., touchscreen) providing narrative GUI region 650C, field GUI region 651C, and input GUI region 652C. Also, as previously discussed in relation to FIG. 6A, user device 160 may include fingerprint sensor 645. Fingerprint sensor 645 and/or the shown graphical user interface regions (e.g., narrative GUI region 650C, field GUI region 651C, and input GUI region 652C) may be example password user interfaces, as described in step 235 of process 200 and step 520 of process 500.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as example only, with the true scope and spirit being indicated by the following claims and their full scope of equivalents.

What is claimed is:

1. A public terminal having an identifier, comprising:
   at least one processor;
   a display device;
   a physical credential reader configured to read a physical credential device of a user; and
   a storage medium storing instructions that, when executed, configure the at least one processor to perform operations comprising:
   reading, using the physical credential reader, a user identifier from the physical credential device;
   transmitting the public terminal identifier and the user identifier to a secure server;
   receiving, after completing the transmission, a unique code generated by the secure server;
   displaying the server-generated unique code on the display device;
   receiving, after displaying the server-generated unique code, a remote session authentication message from the secure server indicating a mobile device associated with the user identifier:
   captured the displayed unique code,
   provided the captured unique code to the secure server, and
   provided valid password input data based on a user profile retrieved by the secure server and associated with the unique code; and responsive to receiving the remote session authentication message, authorizing the mobile device to control one or more operations of the public terminal.

2. The public terminal of claim 1, wherein:
the display device comprises an electronic ink display.

3. The public terminal of claim 2, wherein:
the unique code comprises a quick-response code; and
displaying the unique code comprises displaying the quick-response code on the electronic ink display.

4. The public terminal of claim 3, wherein:
the quick-response code comprises a black-and-white quick response code.

5. The public terminal of claim 1,
further comprising an infrared transmitter;
wherein:
   the unique code comprises an infrared transmission code, and
   displaying the unique code comprises transmitting the infrared transmission code using the infrared transmitter.

6. The public terminal of claim 1,
further comprising an infrared transmitter;
wherein:
   the unique code comprises an infrared transmission code and a quick-response code, and
   displaying the unique code comprises:
      transmitting the infrared transmission code using the infrared transmitter; and
      displaying the quick-response code on the display device.

7. The public terminal of claim 1, wherein:
the physical credential device comprises a transaction card having a magnetic strip; and
the magnetic strip comprises an encoded user identifier.

8. The public terminal of claim 1, wherein:
the physical credential device comprises a transaction card having a magnetic strip and an electronic circuit; and
the user identifier comprises an identifier generated from data contained in the magnetic strip and in the electronic circuit.

9. The public terminal of claim 1, wherein:
the public terminal comprises an automatic teller machine.

10. The public terminal of claim 1, wherein:
the unique code comprises a code based on a cryptographic hash function.

11. The public terminal of claim 1, wherein:
the unique code comprises a code based on a cryptographic hash function of the public terminal identifier and the user identifier.

* * * * *